United States Patent
Frentz

(10) Patent No.: US 7,383,580 B1
(45) Date of Patent: Jun. 3, 2008

(54) COMPUTER VIRUS DETECTION AND PREVENTION

(75) Inventor: Michael Joseph Frentz, Laurel, MD (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 850 days.

(21) Appl. No.: 10/341,734

(22) Filed: Jan. 14, 2003

Related U.S. Application Data

(60) Provisional application No. 60/351,018, filed on Jan. 23, 2002.

(51) Int. Cl.
*G06F 11/00* (2006.01)
*G06F 15/16* (2006.01)
*H04L 9/00* (2006.01)

(52) U.S. Cl. .................. 726/24; 713/181; 709/206

(58) Field of Classification Search ............. 726/23, 726/24
See application file for complete search history.

(56) References Cited

U.S. PATENT DOCUMENTS

| | | | | |
|---|---|---|---|---|
| 6,094,731 | A | * | 7/2000 | Waldin et al. ............ 714/38 |
| 6,992,991 | B2 | * | 1/2006 | Duske et al. ............ 370/316 |
| 2003/0115485 | A1 | * | 6/2003 | Milliken .................. 713/201 |
| 2004/0009771 | A1 | * | 1/2004 | Leppanen et al. ...... 455/426.2 |

OTHER PUBLICATIONS

U.S. Appl. No. 10/654,771; entitled "Harsh-Based Systems and Methods for Detecting and Preventing Transmission of Unwanted E-Mail"; filed Sep. 4, 2003 ; Walter Clark Milliken et al; 64 pages.

\* cited by examiner

*Primary Examiner*—Gilberto Barron, Jr.
*Assistant Examiner*—Kristin D Sandoval

(57) ABSTRACT

A system (140) prevents the spread of viruses in a network (100). The system (140) receives a hash value from a remote device (130), compares the hash value to a group of hash values associated with data messages including viruses, and generates a first message when the hash value matches one of the group of hash values. The first message instructs the remote device (130) to discard a received data message. The system (140) also generates a second message when the hash value does not match one of the group of hash values. The second message instructs the remote device (130) to forward the received data message to a user of the remote device (130).

19 Claims, 5 Drawing Sheets

COMPUTER VIRUS DETECTION AND PREVENTION

RELATED APPLICATION

This application claims priority under 35 U.S.C. § 119 based on U.S. Provisional Application No. 60/351,018, filed Jan. 23, 2002, the entire disclosure of which is incorporated herein by reference.

FIELD OF THE INVENTION

The present invention relates generally to communications systems and, more particularly, to systems and methods for detecting and preventing the spread of electronic mail (e-mail) viruses.

BACKGROUND OF THE INVENTION

Network attacks represent a major threat to the continuous operation of network devices. One type of network attack involves the sending of virus-infected e-mail messages. These e-mail messages typically include an attachment that, when opened at a receiving device, can cause tremendous damage to the receiving device (e.g., totally erasing the memory of the receiving device). Moreover, these types of attacks typically cause the receiving device to become part of the network attack by automatically forwarding the virus-infected e-mail message to e-mail addresses stored at the receiving device.

Current virus inoculation techniques rely on detecting a virus signature at the receiving device. This requires that the user continually update a virus table stored at the receiving device. Not only does the storage of such a table occupy valuable memory, but the above technique causes considerable user interaction. That is, a user must continually check and possibly pay for virus updates to ensure that his/her receiving device is best protected from attack.

Therefore, there exists a need for systems and methods that improve the security of networks and network devices.

SUMMARY OF THE INVENTION

Systems and methods consistent with the present invention address this and other needs by providing a mechanism that prevents the spread of e-mail viruses.

In accordance with the purpose of this invention as embodied and broadly described herein, a method for preventing the spread of electronic viruses in a network is disclosed. The method includes receiving a data message at a first device; hashing the data message to obtain a hash value; transmitting the hash value to a remote device; determining, at the remote device, whether the data message contains a virus using the hash value; transmitting an action message to the first device based on the determining, the action message commanding the first device to perform at least one of discarding the data message and making the data message available to a user of the first device; and processing the data message at the first device based on the action message.

In another implementation consistent with the present invention, a method for preventing a spread of viruses in a network is disclosed. The method includes receiving a data message, hashing the data message to obtain a hash value, comparing the hash value to a group of hash values associated with viruses, and deleting the data message when the hash value matches one of the hash values associated with viruses.

In yet another implementation consistent with the present invention, a computer-readable medium containing instructions for controlling at least one processor to perform a method for preventing a spread of viruses in a network is disclosed. The method includes receiving a hash value from a remote device, comparing the hash value to a group of hash values associated with data messages including viruses, generating a first message when the hash value matches one of the group of hash values, where the first message instructs the remote device to discard a received data message, and generating a second message when the hash value does not match one of the group of hash values, where the second message instructs the remote device to forward the received data message to a user of the remote device.

In still another implementation consistent with the present invention, a system includes a memory that stores instructions and a processor. The processor executes the instructions to receive a data message, hash the data message to obtain a hash value, transmit the hash value to a remote device, the remote device determining whether the data message includes a virus based on the hash value, and discard the data message when the data message is determined to include a virus.

In a further implementation consistent with the present invention, a system includes a first device and a second device. The first device is configured to receive a data message, hash the data message to obtain a hash value, and transmit the hash value to the second device. The second device is configured to receive the hash value from the first device, compare the hash value to a group of stored hash values, generate a first message when the hash value matches one of the stored hash values, where the first message commands the first device to delete the data message, generate a second message when the hash value does not match one of the stored hash values, where the second message commands the first device to forward the data message to a user of the first device, and transmit the first or second message to the first device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention prevent the spread of viruses in networks. In one implementation, the spread of e-mail viruses is prevented by hashing received e-mail messages and comparing the resulting hash values to hash values associated with known viruses. If a match occurs, the corresponding e-mail message is discarded.

Exemplary System

Figure 1:
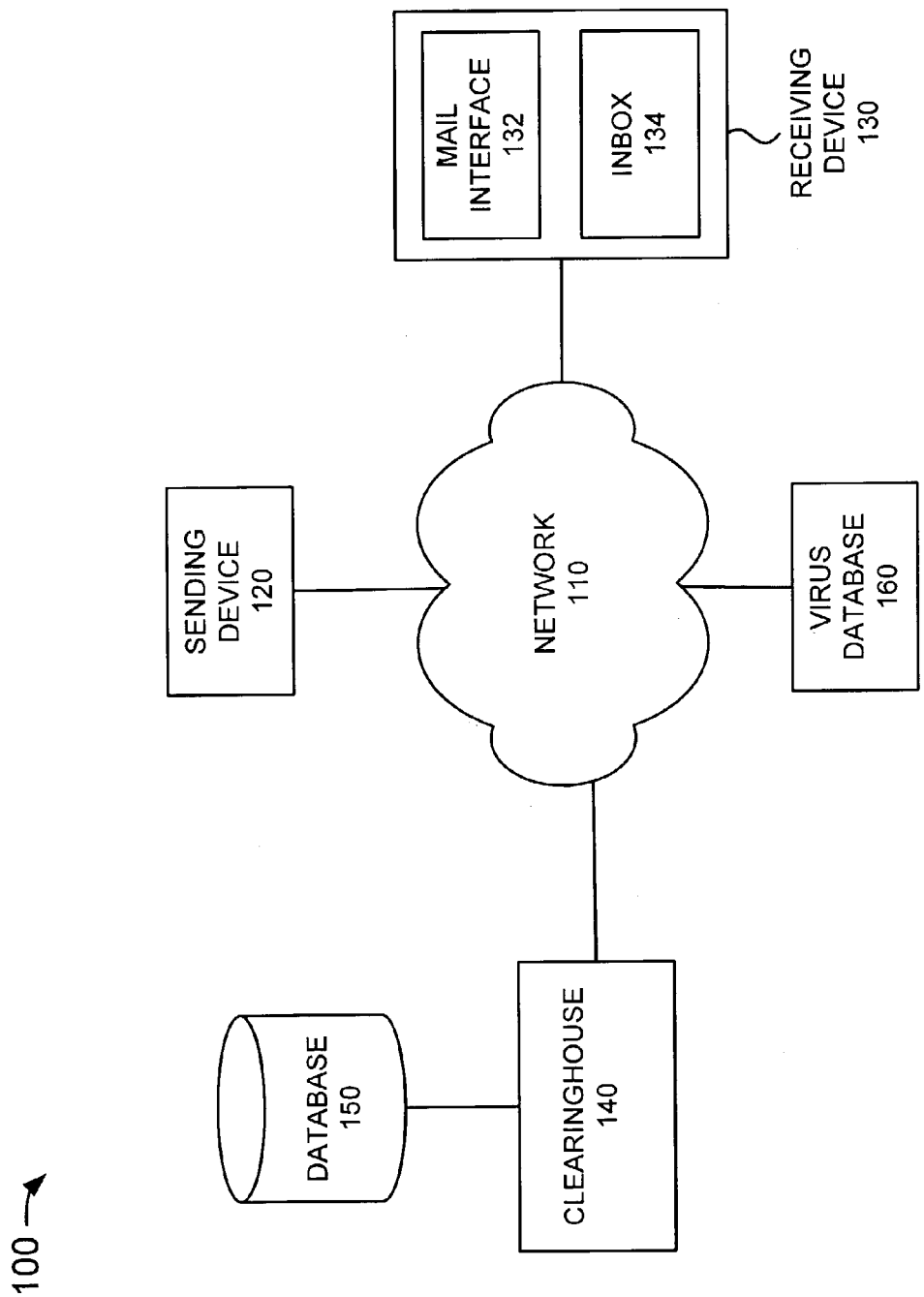
FIG. 1 illustrates an exemplary system in which systems and methods consistent with the present invention may be implemented.

FIG. 1 illustrates an exemplary system 100 in which systems and methods, consistent with the present invention, may be implemented. System 100 may includes a network 110, a sending device 120, a receiving device 130, a clearinghouse device 140, and a virus database 160. The number of components illustrated in FIG. 1 has been shown for simplicity. It will be appreciated that a typical system may include more or fewer components than illustrated in FIG. 1.

Network 110 may include one or more conventional networks, such the Internet, an intranet, a wide area network (WAN), a local area network (LAN), or other types of networks capable of transmitting data. Sending device 120 may include one or more devices capable of transmitting e-mail messages (or other forms of data messages) to other devices, such as receiving device 130. For example, sending device 120 may include a computer system, such as a mainframe, minicomputer, personal computer, a laptop computer, a personal digital assistant (PDA), and the like. Sending device 120 may connect to network 110 via a wired, wireless, or optical connection.

Receiving device 130 may include one or more devices capable of receiving e-mail messages (or other forms of data messages) from sending device 120. For example, receiving device 130 may include a computer system, such as a mainframe, minicomputer, personal computer, a laptop computer, a PDA, and the like. Receiving device 130 may connect to network 110 via a wired, wireless, or optical connection.

In one implementation, receiving device 130 may include an e-mail application that includes a mail interface 132 and an inbox 134. As will be described in additional detail below, mail interface 132 performs initial processing of received e-mail messages and, when a received e-mail message is determined to include a virus, prevents the virus from affecting receiving device 130 or other devices in system 100 by, for example, deleting the e-mail message. Mail interface 132 transfers e-mail messages that are free from viruses to inbox 134. Inbox 134 may include a conventional inbox that stores e-mail messages and makes the e-mail messages available for review by a user of receiving device 130.

Clearinghouse 140 determines whether e-mail messages received by receiving device 130 include viruses. Clearinghouse 140 may include one or more mainframes, minicomputers, personal computers, or the like. Clearinghouse 140 may be associated with a database 150 that stores hashes of known viruses. Database 150 may be stored within clearinghouse 140 or externally from clearinghouse 140.

In one implementation, receiving device 130 hashes received e-mail messages to create hash values and transfers these hash values to clearinghouse 140. Clearinghouse 140 compares received hashed values to the virus hash values stored in database 150. If a match occurs, clearinghouse 140 indicates such to receiving device 130 so that the appropriate e-mail message can be deleted.

Virus database 160 may include a global database that stores a list of known viruses. As will be described in additional detail below, virus database 160 may periodically transfer new viruses to clearinghouse 140 to ensure that database 150 is kept up-to-date.

Figure 2:
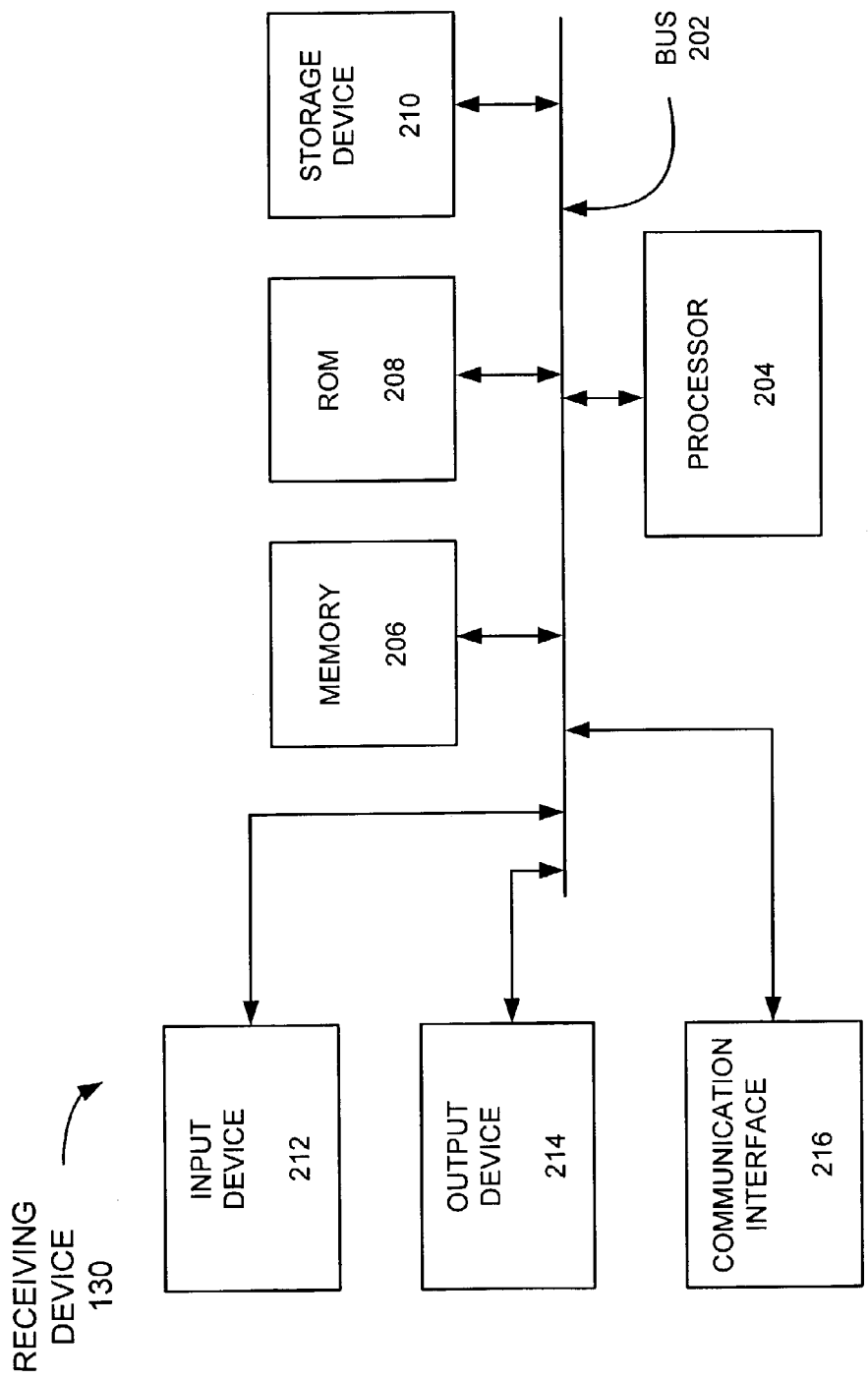
FIG. 2 illustrates an exemplary configuration of the receiving device of FIG. 1.

FIG. 2 illustrates an exemplary configuration of receiving device 130 of FIG. 1. It will be appreciated that the configuration illustrated in FIG. 2 is provided for explanatory purposes only and that many other configurations are possible. Clearinghouse 140 may be similarly configured.

As illustrated, receiving device 130 may include a bus 202, a processor 204, a memory 206, a read only memory (ROM) 208, a storage device 210, an input device 212, an output device 214, and a communication interface 216. Bus 202 permits communication among the components of receiving device 130.

Processor 204 may include any type of conventional processor or microprocessor that interprets and executes instructions. Memory 206 may include a random access memory (RAM) or another type of dynamic storage device that stores information and instructions for execution by processor 204. Memory 206 may also be used to store temporary variables or other intermediate information during execution of instructions by processor 204.

ROM 208 may include a conventional ROM device and/or another type of static storage device that stores static information and instructions for processor 204. Storage device 210 may include a magnetic disk or optical disk and its corresponding drive and/or some other type of magnetic or optical recording medium and its corresponding drive for storing information and instructions.

Input device 212 may include one or more conventional mechanisms that permit an operator to input information to receiving device 130, such as a keyboard, pointing device (e.g., a mouse, a pen, or the like), one or more biometric mechanisms, such as a voice recognition device, etc. Output device 214 may include one or more conventional mechanisms that output information to the operator, such as a display, a printer, a speaker, etc. Communication interface 216 may include any transceiver-like mechanism that enables receiving device 130 to communicate with other devices and/or systems. For example, communication interface 216 may include a modem or an Ethernet interface to a network. Alternatively, communication interface 216 may include other mechanisms for communicating via a data network, such as network 110.

Receiving device 130 (and clearinghouse 140) may implement the functions described below in response to processor 204 executing software instructions contained in a computer-readable medium, such as memory 206. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the present invention are not limited to any specific combination of hardware circuitry and software.

Figure 3:
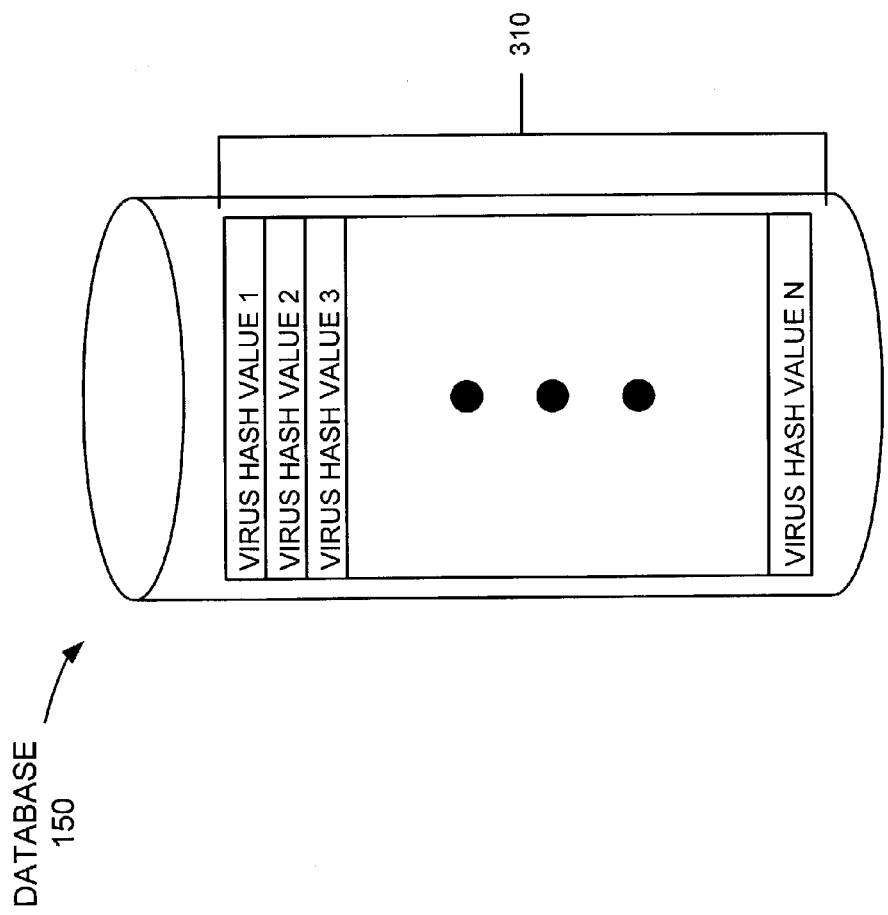
FIG. 3 illustrates an exemplary configuration of the database of FIG. 1.

FIG. 3 illustrates an exemplary configuration of database 150 of FIG. 1. As illustrated, database 150 may include a group of entries 310. Each entry 310 may store a hash value for a known e-mail virus. In one implementation, database 150 stores hash values for all known e-mail viruses. Database 150 may include other information than that illustrated in FIG. 3 to aid in the comparison of received hash values to the virus hash values stored in database 150.

Exemplary Processing

Figure 4:
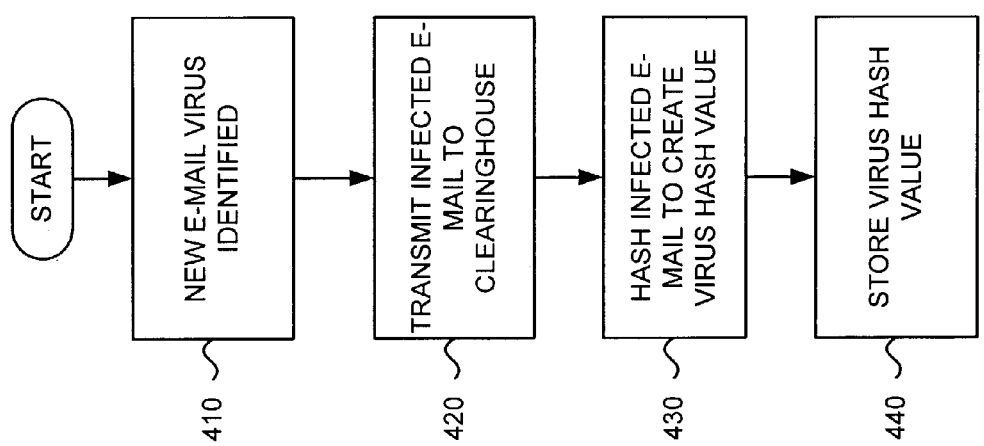
FIG. 4 illustrates an exemplary process for storing/updating virus hash values in the database of FIG. 3 in an implementation consistent with the present invention.

FIG. 4 illustrates an exemplary process for storing/updating virus hash values in database 150 in an implementation consistent with the present invention. Processing may begin with a new e-mail virus being added to or identified by virus database 160 [act 410]. In response to the new e-mail virus being added/identified, virus database 160 may transfer the virus-infected e-mail message to clearinghouse 140 [act 420]. Alternatively, virus database 160 may transmit new virus-infected e-mail messages to clearinghouse 140 at predetermined time intervals or in response to an update request from clearinghouse 140.

Upon receipt of the infected e-mail message from virus database 160, clearinghouse 140 may hash the infected e-mail message to create a virus hash value [act 430]. Techniques for generating one-way hash functions as a function of the contents of a message are well known in the art and will not be discussed in detail herein. Some examples of one-way hash functions include Message Digest 4 (MD4), MD5, Secure Hashing Algorithm 1 (SHA-1), Hashed Message Authentication Code (HMAC), Data Encryption Standard (DES), and RACE Integrity Primitives Evaluation Message Digest 160 (RIPEMD-160).

After hashing the infected e-mail message, clearinghouse 140 may store the hash value in database 150 [act 440]. In this way, clearinghouse 140 is ensured of containing an up-to-date list of known e-mail viruses.

Figure 5:
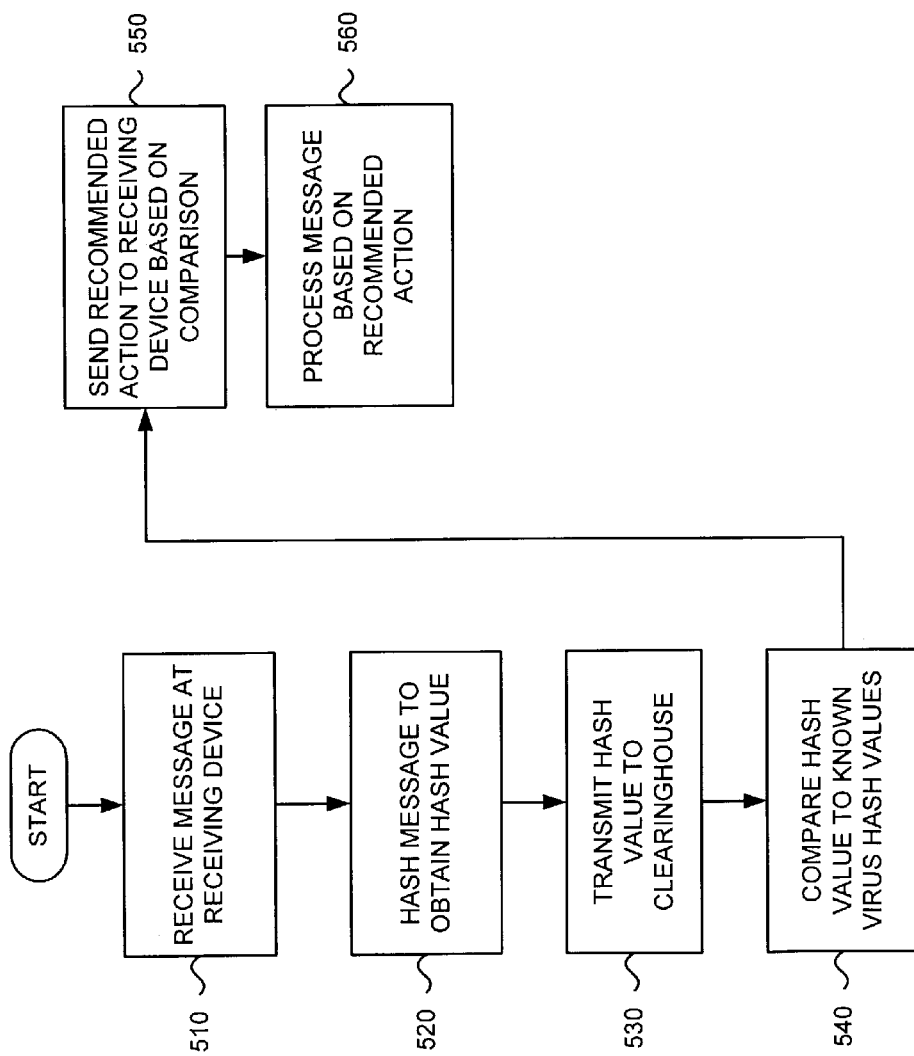
FIG. 5 illustrates an exemplary process for processing e-mail messages in an implementation consistent with the present invention.

FIG. 5 illustrates an exemplary process for processing e-mail messages in an implementation consistent with the present invention. Processing may begin with receiving device 130 receiving an e-mail message [act 510]. In one implementation, the e-mail message may be forwarded directly to mail interface 132. Upon receipt, mail interface 132 may hash the e-mail message to create a hash value [act 520]. Mail interface 132 may, for example, use MD4, MD5, SHA-1, HMAC, DES, RIPEMD-160, or some other one-way hash function to create the hash value. As will be apparent to one skilled in the art, the particular one-way hash function used by mail interface 132 should be the same as the one used by clearinghouse 140 to create the virus hash values stored in database 150.

Once the hash value has been generated, mail interface 132 may forward the hash value to clearinghouse 140 [act 530]. Clearinghouse 140 receives the hash value from receiving device 130 and may determine whether the e-mail message received by receiving device 130 contains a virus. To do so, clearinghouse 140 may compare the hash value to entries 310 in database 150 [act 540]. As described above, database 150 stores hash values for known e-mail viruses.

Clearinghouse 140 may then generate and transmit a recommended action message to mail interface 132 based on the comparison [act 550]. If the received hash value matches an entry 310 in database 150, clearinghouse 140 may transmit a recommended action message that indicates to mail interface 132 that the e-mail message should be deleted. If, on the other hand, the received hash value does not match any of entries 310 in database 150, clearinghouse 140 may transmit a recommended action message that indicates to mail interface 132 that the e-mail message can be passed on to inbox 134.

Upon receipt of the recommended action message from clearinghouse 140, mail interface 132 may process the e-mail message based on the recommended action message [act 560]. As described above, mail interface 132 may delete the e-mail message if the hash value of the e-mail message matches any of the virus hash values stored in database 150. In this way, receiving device 130 is protected from the e-mail virus. Moreover, the spread of the infected e-mail message is prevented. Mail interface 132 may forward the e-mail message to inbox 134 when it is determined that the e-mail message is not infected by a virus.

In an alternative implementation, receiving device 130 forwards received e-mail messages directly to clearinghouse 140. In response, clearinghouse 140 hashes the e-mail message and compares the resulting hash value to the virus hash values stored in database 150. Processing may then continue as described above with respect to acts 550 and 560.

One skilled in the art will appreciate that the above processing may be performed in combination with the electronic communications filtering techniques described in copending, commonly assigned U.S. patent application Ser. No. 09/697,095, filed Oct. 27, 2000, to further protect a receiving device from unwanted and possibly infected electronic communications.

CONCLUSION

Systems and methods, consistent with the present invention, prevent the spread of viruses in networks. In one implementation, the spread of e-mail viruses is prevented by hashing received e-mail messages and comparing the resulting hash values to hash values associated with known viruses. If a match occurs, the corresponding e-mail message is discarded.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4 and 5, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for preventing a spread of electronic viruses in a network, comprising:
    receiving a data message at a first device;
    hashing the data message to obtain a hash value;
    transmitting the hash value to a remote device;
    determining, at the remote device, whether the data message contains a virus using the hash value;
    transmitting an action message from the remote device to the first device based on the determining, the action message commanding the first device to perform at least one of discarding the data message and making the data message available to a user of the first device; and
    processing the data message at the first device based on the action message.

2. The method of claim 1 wherein the data message includes an electronic mail message.

3. The method of claim 1 wherein the determining includes:
comparing the hash value to a plurality of stored hash values, the plurality of stored hash values being associated with viruses,
generating the action message to command the first device to discard the data message when the hash value matches one of the plurality of stored hash values, and
generating the action message to command the first device to make the data message available to a user of the first device when the hash value does not match any of the plurality of stored hash values.

4. The method of claim 1 wherein the hashing includes:
using one of a Message Digest 4 (MD4), MD5, Secure Hashing Algorithm 1 (SHA-1), Hashed Message Authentication Code (HMAC, Data Encryption Standard (DES), and RACE Integrity Primitives Evaluation Message Digest 160 (RIPEMD-160) hash function to hash the data message.

5. A computer-readable medium that is associated with a first device, the medium having tangibly embodied thereon instructions for controlling at least one processor included in the first device to perform a method for preventing a spread of viruses in a network, the method comprising:
receiving in the first device a hash value from a remote device;
comparing the hash value to a plurality of hash values associated with data messages including viruses;
generating a first message when the hash value matches one of the plurality of hash values;
transmitting the first message from the first device to the remote device, the first message instructing the remote device to discard a received data message; and
generating a second message when the hash value does not match one of the plurality of hash values; and
transmitting the second message from the first device to the remote device, the second message instructing the remote device to forward the received data message to a user of the remote device.

6. The computer-readable medium of claim 5 wherein the hash value is associated with the data message.

7. The computer-readable medium of claim 5 further comprising:
transmitting one of the first and second messages to the remote device.

8. A method for preventing a spread of viruses in a network, comprising:
receiving a hash value in a first device;
comparing the received hash value to a plurality of hash values associated with data messages including viruses;
creating a first message when the hash value matches one of the plurality of hash values;
transmitting the first message from the first device to the remote device, the first message instructing the remote device to discard a received data message; and
creating a second message when the hash value does not match one of the plurality of hash values; and
transmitting the second message from the first device to the remote device, the second message instructing the remote device to forward the received data message to a user of the remote device.

9. The method of claim 8 wherein the received hash value is associated with the data message.

10. The method of claim 8 further comprising:
transmitting one of the first and second messages to the remote device.

11. A system for preventing a spread of viruses in a network, comprising:
means for receiving at least one data message;
means for hashing the at least one data message to obtain a hash value;
means for comparing the hash value to a plurality of hash values associated with viruses;
means for generating a first message when the hash value matches one of the plurality of hash values; and
means for transmitting the first message from the first device to the remote device, the first message instructing the remote device to discard a received data message.

12. A first device comprising:
a memory configured to store instructions; and
a processor configured to execute the instructions to:
receive a data message from a remote device,
hash the data message to obtain a hash value, and
transmit a first message from the first device to the remote device, the first message instructing the remote device to discard the data message when the hash value matches one of the plurality of hash values.

13. The first device of claim 12 wherein the processor is further configured to:
transmit a second message from the first device to the remote device, the second message instructing the remote device to forward the received data message to a user of the remote device when the hash value does not match one of the plurality of hash values.

14. A first device comprising:
a memory configured to store instructions; and
a processor configured to execute the instructions to:
receive a hash value from a remote device,
compare the received hash value to a plurality of hash values associated with data messages including viruses,
generating a first message when the received hash value matches one of the plurality of hash values, and
transmit the first message from the first device to the remote device, the first message instructing the remote device to discard a data message associated with the hash value.

15. The first device of claim 14 wherein the processor is further configured to:
generate a second message when the received hash value does not match any of the plurality of hash values, the second message instructing the remote device to forward the data message to a user.

16. The first device of claim 15 wherein the processor is further configured to:
receive at least one data message including a virus,
hash the at least one data message, and
store the at least one hashed data message.

17. The first device of claim 16 wherein the at least one data message is receive at a predetermined time interval.

18. The first device of claim 16 wherein the at least one data message is received in response to an update request from the processor.

19. A system comprising:
a first device configured to:
receive a data message,
hash the data message to obtain a hash value, and
transmit the hash value; and a second device configured to;
  receive the hash value from the first device,
  compare the hash value to a plurality of stored hash values,
  generate a first message when the hash value matches one of the plurality of stored hash values,
  the first message commanding the first device to delete the data message,
  generate a second message when the hash value does not match any of the plurality of stored hash values,
  the second message commanding the first device to forward the data message to a user of the first device, and
  transmit the first or second message to the first device.

* * * * *